(12) United States Patent
Song et al.

(10) Patent No.: US 6,935,639 B1
(45) Date of Patent: Aug. 30, 2005

(54) MEAN PRESSURE ESTIMATION FOR COMPRESSIBLE FLUID STRUT

(75) Inventors: Xubin Song, Canton, MI (US); Carlos Fernando Osorio, Whitmore Lake, MI (US); Jeremy Richard Edmondson, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/782,262

(22) Filed: Feb. 18, 2004

(51) Int. Cl.⁷ .................. B60G 17/01; B60G 23/00; F16F 9/43
(52) U.S. Cl. .................. 280/5.514; 280/124.159; 280/124.161; 267/64.28; 701/38
(58) Field of Search .................. 267/64.17, 64.28; 280/5.514, 6.157, 6.159, 124.157, 124.158, 280/124.159, 124.16, 124.161; 701/37, 38, 701/40

(56) References Cited

U.S. PATENT DOCUMENTS

| | | | |
|---|---|---|---|
| 4,872,702 A | 10/1989 | Medley | |
| 5,029,328 A | 7/1991 | Kamimura et al. | |
| 5,033,770 A | 7/1991 | Kamimura et al. | |
| 5,043,893 A | 8/1991 | Aburaya et al. | |
| 5,071,158 A | 12/1991 | Yonekawa et al. | |
| 5,103,396 A | 4/1992 | Hiwatashi et al. | |
| 5,103,397 A | 4/1992 | Ikemoto et al. | |
| 5,104,143 A | 4/1992 | Yonekawa | |
| 5,113,345 A | 5/1992 | Mine et al. | |
| 5,119,297 A | 6/1992 | Buma et al. | |
| 5,144,559 A | 9/1992 | Kamimura et al. | |
| 5,162,995 A | 11/1992 | Ikemoto et al. | |
| 5,177,681 A | 1/1993 | Sato | |
| 5,598,337 A | 1/1997 | Butsuen et al. | |
| 5,619,413 A | 4/1997 | Oakley | |
| 5,630,623 A * | 5/1997 | Ganzel | 280/124.106 |
| 5,684,698 A | 11/1997 | Fujii et al. | |
| 6,032,090 A | 2/2000 | von Bose | |
| 6,202,010 B1 | 3/2001 | Shono et al. | |
| 6,259,982 B1 * | 7/2001 | Williams et al. | 701/38 |
| 6,282,470 B1 | 8/2001 | Shono et al. | |
| 6,389,341 B1 | 5/2002 | Davis | |
| 6,418,363 B2 | 7/2002 | Cochofel et al. | |
| 6,470,248 B2 | 10/2002 | Shank et al. | |
| 6,523,845 B2 * | 2/2003 | Stiller | 280/124.16 |
| 6,598,885 B2 | 7/2003 | Delorenzis et al. | |
| 2003/0075881 A1 | 4/2003 | Detorenzis et al. | |

FOREIGN PATENT DOCUMENTS

EP 718496 A2 * 6/1996 .......... F04B 49/06

* cited by examiner

Primary Examiner—Thomas Williams
(74) Attorney, Agent, or Firm—Brinks Hofer Gilson & Lione

(57) ABSTRACT

A method and apparatus is provided for estimating the mean pressure in a compressible fluid strut. A database is employed containing values for mean pressure variation corresponding to a specific combination of motor speed and flow demand, and may also account for strut temperature. The flow demand and the speed of the motor are determined, and the mean variation corresponding to the determined combination of motor speed and flow demand is selected. The estimation of strut mean pressure is updated with the selected mean pressure variation. In this way, costly pressure sensors are eliminated as well as the complicated control algorithms which are used therewith.

20 Claims, 3 Drawing Sheets

MEAN PRESSURE ESTIMATION FOR COMPRESSIBLE FLUID STRUT

FIELD OF THE INVENTION

The present invention relates to a method and apparatus for estimating the mean pressure in a compressible fluid strut, forming a portion of an active suspension system in a motor vehicle.

BACKGROUND OF THE INVENTION

An active suspension system for a motor vehicle utilizes actuable struts at each wheel of the vehicle whereby the pressure within the struts may be controlled to actively regulate the damping and spring effect of the suspension system. One key component of such an active suspension system is a pressure detector or sensor that provides a reading of the strut mean pressure for each strut. As used herein, the strut mean pressure is the static pressure variation a strut can have after executing flow demands.

Typically, a high level vehicle dynamics controller creates a desired pressure for a particular strut, and based on a comparison between the detected strut mean pressure and the desired pressure, an actuator increases or decreases the pressure within the strut to meet the desired pressure level. It can therefore be seen that the pressure sensor is a very important component of the active suspension system.

When a strut is exposed to payload, vibration and the execution of flow demands, the strut pressure is composed of payload-dependent pressure (i.e. precharged pressure), vibration-dependent pressure, and pulsation-dependent pressure. Additionally, the strut load also includes friction due to vibration. Unfortunately, all of these pressure components are not desirable from the standpoint of controlling the pressure within the strut. Specifically, if a pressure sensor is used, the control algorithm needs to include a complicated estimation algorithm to figure out the achieved controllable pressure when a flow demand is executed. The complicated estimation algorithm must factor out certain pressure components such as those previously mentioned.

Accordingly, there exist a need to provide a method and apparatus for estimating the strut mean pressure in a strut forming a portion of an active suspension system, the method and apparatus eliminating the need for a costly pressure sensor and the complicated estimation algorithm which are required to determine the achieved controllable pressure.

BRIEF SUMMARY OF THE INVENTION

The present invention provides a method and apparatus for estimating the mean pressure in a compressible fluid strut without the use of a pressure sensor or complicated estimation algorithms. The strut forms a portion of an active suspension system for a vehicle, the system further including a motor having a crankshaft driving a cylinder, the cylinder being responsive to flow demands to deliver or remove fluid from the strut.

One embodiment of the method includes the steps of providing a database of values for mean pressure variation corresponding to a specific combination of motor speed and flow demand. The flow demand and the speed of the motor are determined, and the mean variation corresponding to the determined combination of motor speed and flow demand is selected. The estimation of strut mean pressure is updated with the selected mean pressure variation. In this way, costly pressure sensors are eliminated as well as the complicated control algorithms which are used therewith.

According to more detailed aspects, the method further includes the step of determining the period of the mean pressure variation based on the motor speed. A mean pressure rate may then be determined based on the mean pressure variation and the period. The mean pressure rate equals the mean pressure variation divided by the period. The updating step preferably includes updating the estimation of strut mean pressure with a mean pressure rate over a length of time equal to the period. The estimation of strut mean pressure is preferably updated according to the equation $SMP_c = SMP_p + \lambda * MPR$ where $SMP_c$ is current estimated strut mean pressure $SMP_p$ is prior estimated strut mean pressure, $\lambda$ is the efficiency of the motor (including electric and hydraulic sub-systems), and MPR is mean pressure rate. The quantity expressed by $\lambda * MPR$ may also be adjusted by a factor $(1+a)$ for the first half of the period and the factor $(1-a)$ for the second half of the period.

The method also preferably adjusts for temperature variation of the strut. That is, the database may include values for mean pressure variation corresponding to a specific combination of motor speed, temperature and flow demand. Further, the updating step may be delayed by a period of time corresponding to the travel time of fluid flow from the cylinder to the strut.

An active suspension system constructed in accordance with an embodiment of the present invention includes a motor, a cylinder and a compressible fluid strut. The motor has a crankshaft and the cylinder is driven by the crankshaft. The cylinder has high pressure and low pressure valves for supplying and removing fluid from the strut. The strut is fluidically connected to the cylinder for increasing or decreasing the pressure in the strut. A vehicle dynamics controller generates a requested pressure for the strut. A device control is provided for regulating the pressure in the strut. The device control includes a valve controller, a mean pressure estimator, and flow demand creator. The valve controller regulates the high and low pressure valves of the cylinder. The mean pressure estimator provides an estimation of the mean pressure in the strut. The flow demand creator sends flow demand signals to the valve controller based on the difference between the requested pressure and the estimation of current mean pressure. The mean pressure estimator receives data on the speed of the motor and the flow demand signals, and based thereon determines a mean pressure variation. The estimation of strut mean pressure is updated with the mean pressure variation.

According to more detailed aspects, a database is provided having mean pressure variation values corresponding to specific combinations of motor speed and flow demand. When temperature of the strut is accounted for, the database has mean pressure variation values corresponding to specific combinations of motor speed, temperature and flow demand. The mean pressure estimator determines the period of the mean pressure variation based on the motor speed. Then, the mean pressure estimator determines a mean pressure rate based on the mean pressure variation divided by the period.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
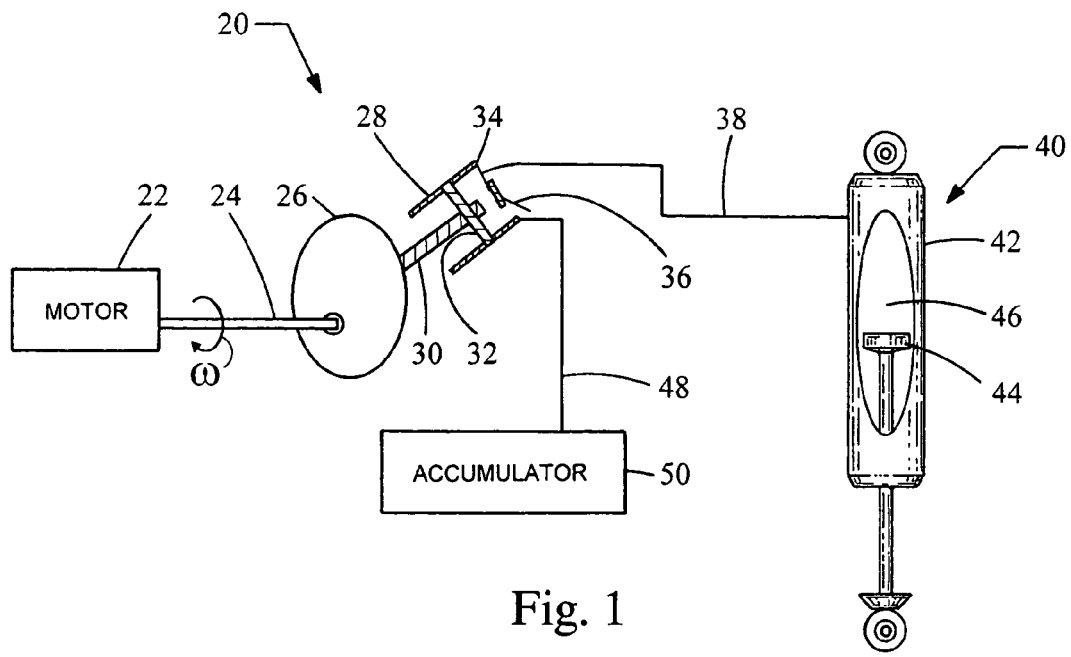
FIG. 1 is a schematic illustration of an embodiment of an active suspension system constructed in accordance with the teachings of the present invention.

Turning now to the figures, FIG. 1 depicts a schematic illustration of an active suspension system 20 constructed in accordance with the teachings of the present invention. The active suspension system 20 includes, among other components not listed or shown here, a motor 22 driving a cylinder 28, which in turn supplies and returns pressurized fluid to a compressible fluid strut 40. The motor 22 is preferably a digital displacement pump motor which allows execution of discrete flow demands. The motor 22 includes a shaft 24 which in turn drives a crankshaft that 26 translates the rotational motion of the motor 22 and shaft 24 into an axial motion for driving the cylinder 28.

The cylinder 28 generally includes a piston rod 30 connected to a piston 32. The piston rod 30 is driven by the crankshaft 26, and the piston 32 reciprocates within the cylinder 28 to pressurize fluid contained therein. The cylinder 28 includes a high pressure valve 34 and a low pressure valve 36. The high pressure valve 34 is fluidically connected via a conduit 38 to the compressible fluid strut 40. The low pressure valve 36 is fluidically connected to an accumulator 50 via a conduit 48. The accumulator 50 is utilized to store a charge of fluid which may be provided to the strut 40, or alternatively which may have been removed from the strut 40. The strut 40 generally includes a cylinder 42 having a piston 44 fitted therein to divide the cylinder 42 into upper and lower portions which are filled with a fluid 46 such as a composition of liquid silicone as is known in the art. It will be recognized that numerous fluid mediums 46 may be utilized in conjunction with the present invention.

Figure 2:
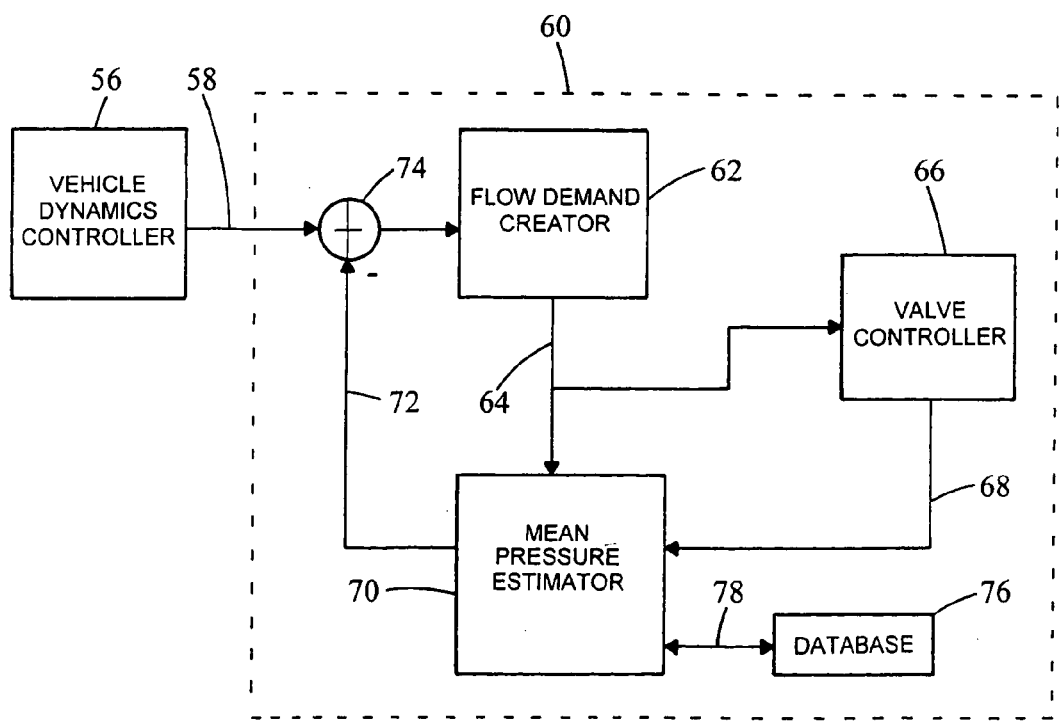
FIG. 2 is a schematic diagram showing a device controller forming a portion of the active suspension system which is in communication with the vehicle dynamics controller.

Turning to FIG. 2, the cylinder 28 and its valves 34, 36 are regulated by a low level device controller 60 in order to supply or remove fluid to or from the strut 40. The device controller 60 generally includes a flow demand creator 62, a valve controller 66, and a mean pressure estimator 70. The valve controller 66 is the actuator responsible for controlling the valves 34, 36 of the cylinder 28, and hence the flow of fluid to or from the strut 40. The valve controller 66 receives a command 64 from the flow demand creator 62 which opens or closes the valves 34, 36 in order to achieve the desired pressure within the strut 40.

The vehicle dynamics controller 56 sends a signal 58 to the device controller 60 that is indicative of a desired or requested pressure in the strut 40. The mean pressure estimator 70 outputs a signal 72 indicative of the current estimated mean pressure in the strut 40 which is compared to the requested pressure 58 at subtractor 74. Based on the difference between the requested pressure 58 and the current estimated mean pressure 72, the flow demand creator 62 generates a signal 64 which is used by the valve controller 66 to operate the valves 34, 36 of the cylinder 28 to adjust the pressure within the strut 40. In this way, the device controller 60 makes the actuation system a smart actuator for active suspension control.

It can be seen in FIG. 2 that the mean pressure estimator 70 also receives the signal 64 from the flow demand creator 62. Using this data 64, as well as other data such as the speed of the motor 22 and the temperature of the strut 40, the mean pressure estimator 70 utilizes a database 76 having stored values of mean pressure variation 78 corresponding to the particular combination of flow demand, motor speed and temperature. Using the mean pressure variation 78 from the database 76, the mean pressure estimator 70 updates the current estimation of mean pressure 72 for continued use by the device controller 60.

The process or algorithm 80 employed by the mean pressure estimator 70 will now be described in detail with reference to FIGS. 3–5. The algorithm 80 used by the mean pressure estimator 70 receives several pieces of information including the flow demand 64 as previously discussed. The algorithm 80 also receives information on motor speed 82, strut temperature 84 and the shaft trigonometry 86 which is representative of the positioning of the crankshaft 26 in thus the cylinder 28.

Generally, there are five flow demands to control each cylinder 28. The five flow demands are full pumping (FP), partial pumping (PP), partial motoring (PM), full motoring (FM), and idle. Each one of these flow demands represents a particular combination of high pressure valve 34 position and low pressure valve 36 position. Pumping generally refers to providing pressurized fluid to the strut 40, while motoring generally refers to removing pressurized fluid from the strut 40, thus driving the motor 22 as a generator. Each strut 40 generally includes two cylinders 28 linked thereto. Accordingly, there are 14 combined flow demands available for each strut.

The database 76 may be constructed by testing a particular vehicle by setting up the compressible fluid strut 40 and the active suspension system 20 to represent an on vehicle installation. The motor 22 is then run at a certain nominal speed that is specified for production system requirements. During the testing, a series of FP, PP, PM, FM, IDLE or their combination are sent to the device controller 60, and in particular the valve controller 66. At the same time, the motor speed, strut pressure, shaft trigonometry and strut temperature are monitored to provide collected testing data which characterizes the variation of the strut mean pressure for each one command corresponding to the different flow demands. For example, at a certain motor speed and temperature, the least mean square method can be applied to determine the mean pressure variation with respect to a single flow demand (FP, PP, PM, and FM).

Figure 3:
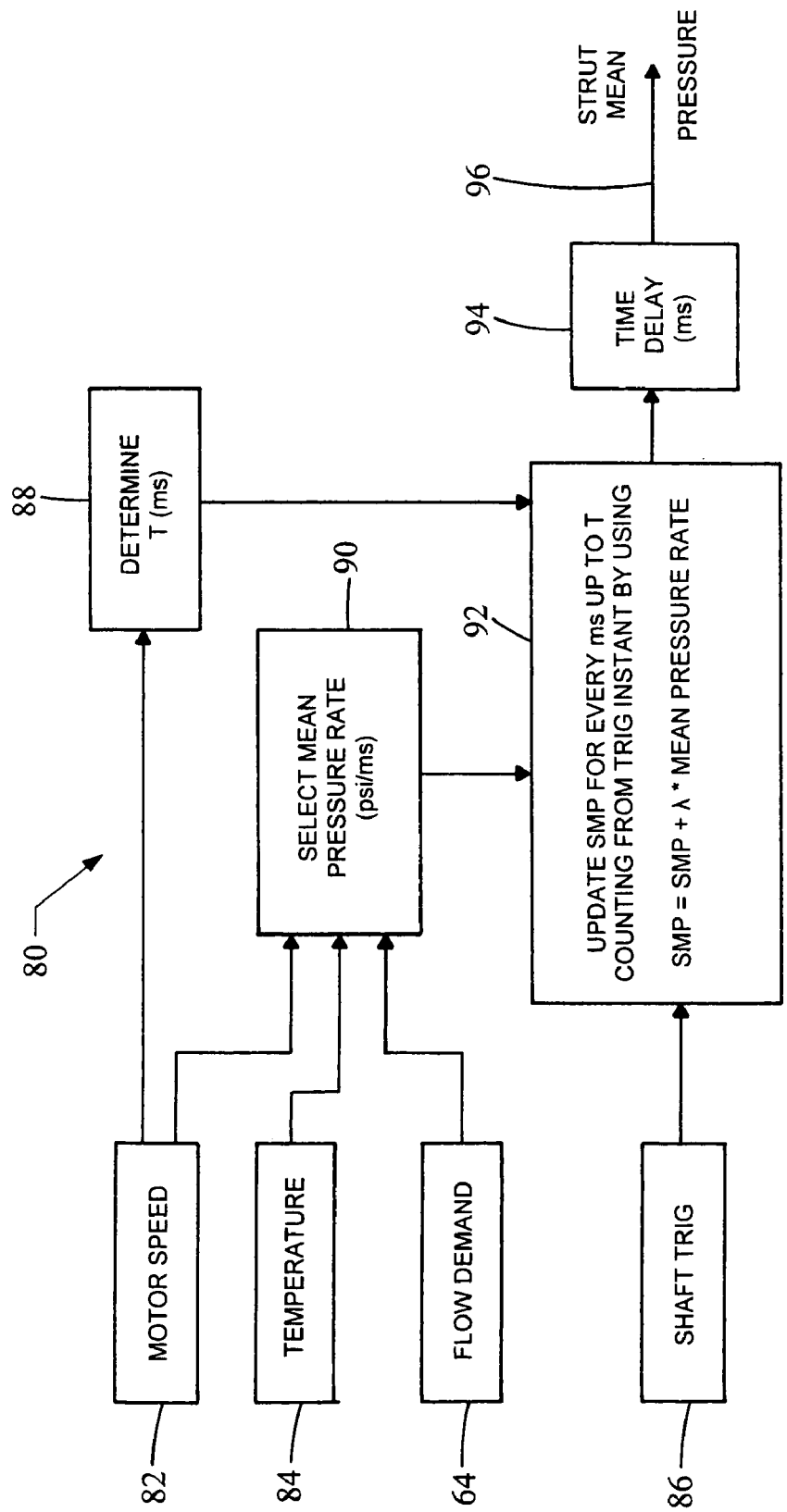
FIG. 3 is a schematic flow diagram showing an algorithm for updating the estimation of strut mean pressure in accordance with the teachings of the present invention.

With reference to FIG. 3, the algorithm 80 utilizes the data on motor speed 82 to determine the period (T, ms) related to the mean pressure variation, since the motor speed 82 can be changed according to the flow demand for each cylinder 28. The algorithm 80 utilizes the database 76 to look up the mean pressure variation 78 corresponding to the particular combination of motor speed 82, strut temperature 84 and the flow demand 64. The algorithm determines the period T as indicated by block 88. As indicated at block 90, the mean pressure rate is determined according to the equation:

$$MPR = MPV/T \qquad (1)$$

where MPR is mean pressure rate, MPV is mean pressure variation and T is the period.

When the flow demand is IDLE, the mean pressure rate=0. The mean pressure rate is computed for each cylinder 28 and each flow demand thereon in order to update the strut mean pressure (SMP). As indicated at step 92, the strut mean pressure is updated every millisecond for a length of time equal to the period T according to the equation:

$$SMP_c = SMP_p + \lambda * MPR. \quad (2)$$

where $SMP_c$ is the current strut mean pressure and $SMP_p$ is the prior strut mean pressure.

The $\lambda$ represents a variable which is set to approximate the efficiency of the digital displacement pump motor 22 (including the combined electric and hydraulic sub-systems), and hence $\lambda$ usually falls between 0.9 and 1.1. In most cases, $\lambda=1$. The efficiency for different flow demand combinations can be decided by using the testing data through an optimization process to reduce the estimation error.

A time delay is calculated as indicated at block 94, the time delay being predetermined to represent the travel time of the flow demand execution through the pipe lines from the motor 22 to the compressible fluid strut 40. Finally, the algorithm 80 sends a current estimate 96 of the strut mean pressure, which is utilized by the mean pressure estimator 70 and the device controller 60 in order to generate future flow demands as previously discussed with reference to FIG. 2.

In accordance with another embodiment of the present invention, the strut mean pressure can be updated according to the following equations:

$$SMP_c = SMP_p + \lambda * MPR * (1+a). \quad (3)$$

$$SMP_c = SMP_p + \lambda * MPR * (1-a). \quad (4)$$

In this case, a is a value between 0 and 1, in the mean pressure estimator 70 will utilize equation 3 for the first half of the period (T), and then use the equation 4 for the second half of the period (T). Accordingly, based on the testing data, the equations for determining the strut mean pressure may be adjusted between the first half of the period and the second half of the period to more accurately reflect the change in pressure within the compressible fluid strut 40.

Figure 4:
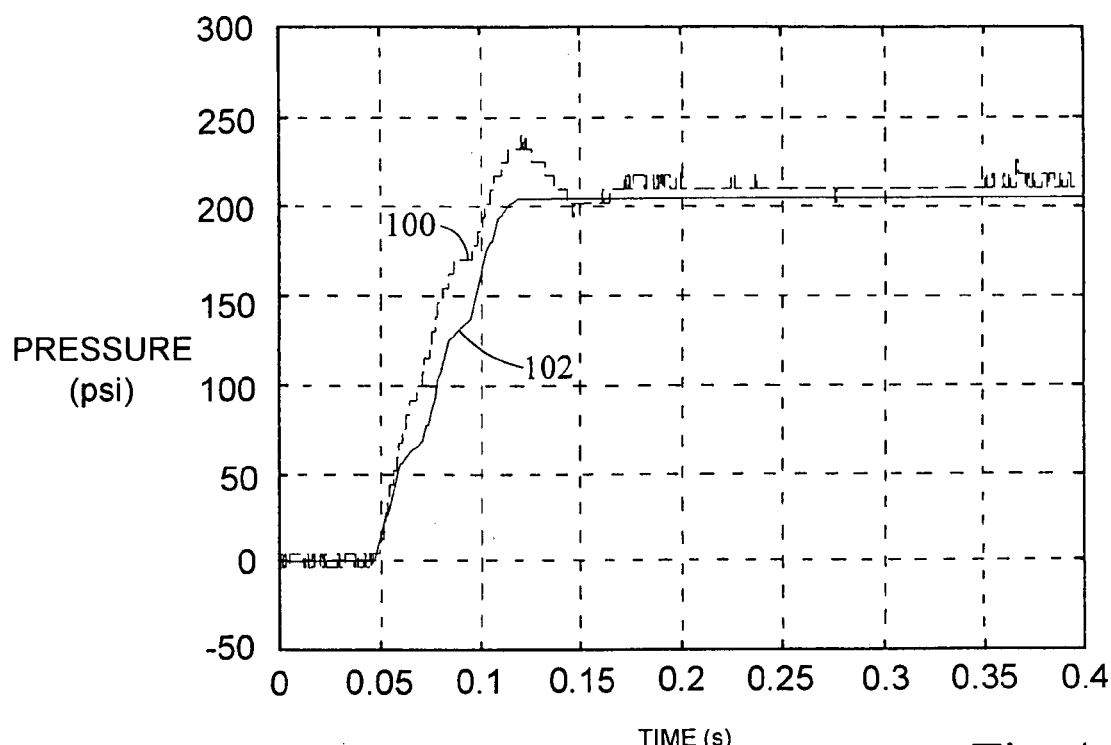
FIG. 4 is graph showing a comparison of the pressure as detected through a pressure sensor versus the estimation generated in accordance with the present invention.

FIG. 4 depicts a graph showing the change in pressure (shown on the Y axis) over time (shown on X axis). The first line 100 represents actual testing data that was directly detected for a single strut 40 being controlled by a first cylinder having a flow demand of full pumping (FP) and a flow demand of IDLE for the other cylinder 28. The second line 102 represents the current estimation of strut mean pressure ($SMP_c$) estimated by the device controller 60 and the mean pressure estimator 70 as previously discussed. It can be seen that the estimation of mean pressure in accordance with the present invention eliminates much of the undesired fluctuations in the detected pressure 100.

Figure 5:
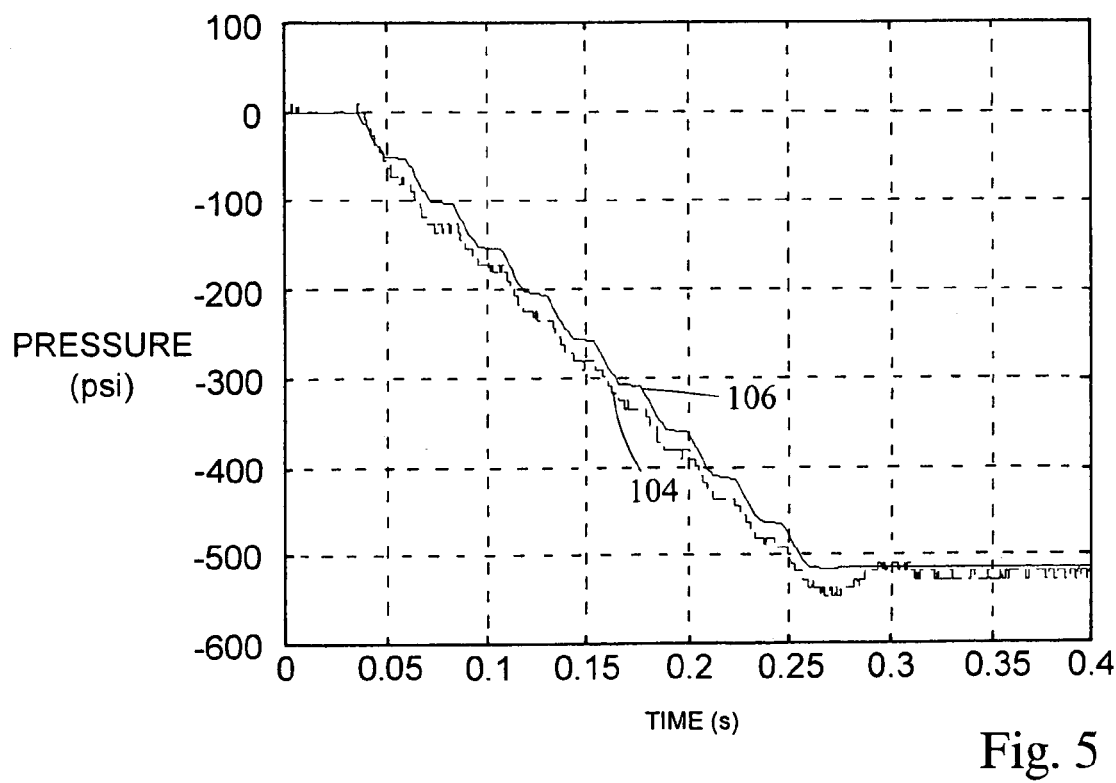
FIG. 5 is also a graph showing a comparison of the pressure as detected through a pressure sensor versus the estimation generated in accordance with the present invention.

Similarly, FIG. 5 depicts a graph of pressure versus time for one cylinder having a flow demand of full motoring (FM) and the other cylinder having a flow demand of partial pumping (PP). As in the previous figure, the line 104 represents the testing data, while line 106 represents the data generated from the device controller 60 and the mean pressure estimator 70 of the present invention.

Accordingly, the present invention provides a method to continuously update the mean pressure in a compressible fluid strut in correspondence with the flow demands executed by a digital displacement pump motor. The present invention excludes pressure sensors in the pulsations induced by executing the discrete flow demands. In the estimation, motor speed and strut temperature are included to improve the accuracy in all environments and operating conditions.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of estimating the mean pressure in a compressible fluid strut, the strut forming a portion of an active suspension system for a vehicle, the active suspension system including a motor having a crankshaft driving a cylinder, the cylinder being responsive to flow demands to deliver or remove fluid in the strut, the method comprising the steps of:
   providing a database of values for mean pressure variation corresponding to a specific combination of motor speed and flow demand
   determining the flow demand;
   determining a speed of the motor;
   selecting the mean pressure variation corresponding to the determined combination of motor speed and flow demand;
   updating the estimation of strut mean pressure with the selected mean pressure variation.

2. The method of claim 1, further comprising the step of determining the period of the mean pressure variation based on the motor speed.

3. The method of claim 2, further comprising the step of determining a mean pressure rate based on the mean pressure variation and the period.

4. The method of claim 3, wherein the mean pressure rate equals the mean pressure variation divided by the period.

5. The method of claim 3, wherein the updating step includes updating the estimation of strut mean pressure with the mean pressure rate over a length of time equal to the period.

6. The method of claim 3, wherein the estimation of strut mean pressure is updated according to the equation $SMP_c = SMP_p + MPR$, where $SMP_c$ is current strut mean pressure, $SMP_p$ is prior strut mean pressure and MPR is mean pressure rate.

7. The method of claim 3, wherein the estimation of strut mean pressure is updated according to the equation $SMP_c = SMP_p + \lambda * MPR$, where $SMP_c$ is current strut mean pressure, $SMP_p$ is prior strut mean pressure, $\lambda$ is the efficiency of the motor, and MPR is mean pressure rate.

8. The method of claim 3, wherein the estimation of strut mean pressure is updated according to the equation $SMP_c = SMP_p + \lambda * MPR * (1+a)$ for the first half of the period, and the equation $SMP_c = SMP_p + \lambda * MPR * (1-a)$ for the second half of the period, where $SMP_c$ is current strut mean pressure, $SMP_p$ is prior strut mean pressure, $\lambda$ is the efficiency of the motor, MPR is mean pressure rate, and a is a predetermined constant to allow adjustment of the estimation.

9. The method of claim 1, wherein the database includes values for mean pressure variation corresponding to a specific combination of motor speed, temperature and flow demand, and further comprising the step of determining a temperature, and wherein the selecting step includes selecting the mean pressure variation corresponding to the determined combination of motor speed, temperature and flow demand.

10. The method of claim 1, wherein the updating step includes determining a time delay and delaying the update for the time delay.

11. The method of claim 1, the active suspension system including two cylinders being responsive to flow demands to deliver or remove fluid in the strut, and wherein the flow demand is determined for each of the two cylinders.

12. The method of claim 11, wherein the selecting step includes selecting the mean pressure variation corresponding to the determined combination of motor speed and the two flow demands.

13. An active suspension system for a vehicle comprising:
a motor having a crankshaft a cylinder driven by the crankshaft, the cylinder having high pressure and low pressure valves,
a compressible fluid strut fluidically connected to the cylinder for increasing or decreasing the pressure in the strut;
a vehicle dynamics controller generating a requested pressure for the strut;
a device control for regulating the pressure in the strut, the device control including a valve controller, a mean pressure estimator and a flow demand creator, the valve controller regulating the high and low pressure valves of the cylinder, the mean pressure estimator providing an estimation of the mean pressure in the strut, the flow demand creator sending flow demand signals to the valve controller based on the difference between the requested pressure and the estimation of current mean pressure; and wherein the mean pressure estimator receives data on the speed of the motor and the flow demand signals, determines a mean pressure variation corresponding to the motor speed and flow demand, and updates the estimation of strut mean pressure with the mean pressure variation.

14. The active suspension system of claim 13, further comprising a database having mean pressure variation values corresponding to specific combinations of motor speed and flow demand.

15. The active suspension system of claim 13, further comprising a database having mean pressure variation values corresponding to specific combinations of motor speed, temperature and flow demand.

16. The active suspension system of claim 15, wherein the mean pressure estimator receives data on the temperature, and wherein the mean pressure estimator determines a mean pressure variation corresponding to the motor speed, temperature and flow demand.

17. The active suspension system of claim 13, wherein the mean pressure estimator determines the period of the mean pressure variation based on the motor speed.

18. The active suspension system of claim 17, wherein the mean pressure estimator determines a mean pressure rate based on the mean pressure variation divided by the period.

19. The active suspension system of claim 18, wherein the mean pressure estimator updates the estimation of strut mean pressure with the mean pressure rate over a length of time equal to the period.

20. The active suspension system of claim 18, wherein the estimation of strut mean pressure is updated according to the equation $SMP_c = SMP_p + \lambda * MPR$, where $SMP_c$ is current strut mean pressure, $SMP_p$ is prior strut mean pressure, $\lambda$ is the efficiency of the motor, and MPR is mean pressure rate.

* * * * *